(12) United States Patent   (10) Patent No.: US 8,087,859 B2
Nelson                      (45) Date of Patent:     Jan. 3, 2012

(54) SYSTEMS AND METHODS FOR SEPARATING CARGO SPACES

(75) Inventor: Chad Nelson, Rice Lake, WI (US)

(73) Assignee: FG Products, Inc., Rice Lake, WI (US)

( * ) Notice: Subject to any disclaimer, the term of this patent is extended or adjusted under 35 U.S.C. 154(b) by 323 days.

(21) Appl. No.: 12/269,547

(22) Filed: Nov. 12, 2008

(65) Prior Publication Data

US 2010/0119323 A1    May 13, 2010

(51) Int. Cl.
    *B61D 45/00*    (2006.01)
(52) U.S. Cl. ............................................. 410/130
(58) Field of Classification Search .......... 410/121, 410/129, 130, 131, 135, 140; 296/24.4, 24.41; 220/529, 530, 531, 534, 543, 544, 552
See application file for complete search history.

(56) References Cited

U.S. PATENT DOCUMENTS

| | | |
|---|---|---|
| 723,231 A | 3/1903 | Benedict |
| 1,061,974 A | 5/1913 | Bohn |
| 1,193,255 A | 8/1916 | Gibbs |
| 1,896,198 A | 2/1933 | MacMillan |
| 1,970,610 A | 8/1934 | McMullen et al. |
| 2,324,721 A | 7/1943 | O'Connor |
| 2,346,853 A | 4/1944 | Lundvall |
| 2,752,864 A | 7/1956 | McDougal, Sr. et al. |
| 2,866,419 A | 12/1958 | Candlin, Jr. |
| 2,895,431 A | 7/1959 | Ford |
| 3,017,843 A | 1/1962 | Loomis et al. |
| 3,057,284 A | 10/1962 | Learmont |
| 3,070,044 A | 12/1962 | Tobin |
| 3,162,146 A | 12/1964 | Knippel et al. |
| 3,217,664 A | 11/1965 | Aquino et al. |
| 3,413,932 A | 12/1968 | Bennett |
| 3,438,149 A | 4/1969 | Ilg |
| 3,680,492 A | 8/1972 | Weage |
| 4,019,442 A | 4/1977 | Lee et al. |
| 4,049,311 A | 9/1977 | Dietrich et al. |
| 4,265,577 A | 5/1981 | Loomis |
| 4,281,870 A | 8/1981 | Ehrlich et al. |
| 4,639,031 A | 1/1987 | Truckenbrodt |

(Continued)

FOREIGN PATENT DOCUMENTS

DE    298 20 764    2/1999

(Continued)

OTHER PUBLICATIONS

Trade Literature describing Randall Bulkhead Systems believed to have been offered for sale prior to Jul. 20, 2001 13 pages.

(Continued)

*Primary Examiner* — H Gutman
(74) *Attorney, Agent, or Firm* — Oblon, Spivak, McClelland, Maier & Neustadt, L.L.P.

(57) ABSTRACT

Some embodiments of a system for separating cargo spaces in a temperature-controlled cargo container (such as a refrigerated trailer) can include first and second panels that are mountable in an interior space of the cargo container by a track-mounting system to movably support the first and second half-width bulkhead panels in the trailer. The first and second panels may have a generally flexible construction to absorb impacts from cargo, forklifts, or the like, but may also include stiffening members that are coupled to the first and second panels to provide added rigidity in particular orientations.

20 Claims, 9 Drawing Sheets

U.S. PATENT DOCUMENTS

| | | | |
|---|---|---|---|
| 4,880,342 | A | 11/1989 | Pradovic |
| 4,886,404 | A | 12/1989 | Jensen et al. |
| 5,010,943 | A | 4/1991 | Boyer |
| 5,161,848 | A | 11/1992 | Lutton |
| 5,265,993 | A | 11/1993 | Wayne |
| 5,664,386 | A | 9/1997 | Palmersten |
| 5,704,676 | A | 1/1998 | Hill |
| 5,984,601 | A | 11/1999 | Jevaney et al. |
| 6,017,175 | A | 1/2000 | Kassab et al. |
| 6,247,740 | B1 | 6/2001 | Smith |
| 6,626,625 | B2 | 9/2003 | Nelson et al. |
| 6,923,610 | B2 | 8/2005 | Nelson et al. |
| 7,195,435 | B2 | 3/2007 | Clark |
| 7,214,017 | B2 | 5/2007 | Nelson et al. |
| 7,338,239 | B2 | 3/2008 | Nelson et al. |
| 7,445,412 | B2 | 11/2008 | Nelson et al. |
| 7,600,955 | B2 * | 10/2009 | Nelson et al. ................ 410/130 |
| 7,607,874 | B2 * | 10/2009 | Nelson et al. ................ 410/130 |

FOREIGN PATENT DOCUMENTS

GB  2238988  6/1991

OTHER PUBLICATIONS

Trade Literature describing Tempar Bulkhead Systems believed to have been offered for sale prior to Jul. 20, 2001, 17 pages.
Trade Literature describing ROM Bulkhead Systems believed to have been offered for sale prior to Jul. 20, 2001, 12 pages.
Trade Literature describing Bulkhead Seals believed to have been offered for sale prior to Jul. 20, 2001, 8 pages.
Trade Literature describing Donovan Bulkhead Systems believed to have been offered for sale prior to Jul. 20, 2001, 21 pages.
Trade Literature describing FG Products Bulkhead Systems believed to have been offered for sale prior to Jul. 20, 2001. 48 pages.
Trade Literature describing ISOWALL Insulation Partition Walls believed to have been offered for sale prior to Jul. 20, 2001, 2 pages.
Trade Literature describing LOAD-LOK Cargo Restraint Systems believed to have been offered for sale prior to Jul. 20, 2001, 5 pages.
Trade Literature describing Schmitz Cargobull Bulkhead Systems believed to have been offered to sale prior to Jul. 20, 2001, 12 pages.
Advertisement for "Floater II Insulated Bulkhead" by F/G Products, Refrigerated Transporter, Feb. 1995, p. 57.
Advertisement for "Flex-Lite: and Floater II" by F/G Products, Refrigerated Transporter, Jun. 1996, p. 65.
Advertisement for "The Loadmaker by ROM" Refrigerated Transporter, Feb. 1987, p. 49.
Advertisement for "The Loadmaker with DuroSeal Protection" Refrigerated Transporter, Feb. 1997, p. 21.
Advertisement for "The Tough One" by Randall Industries, Refrigerated Transport, Dec. 1994, p. 25.
Moveable Bulkheads for Multi-Temperature Service:, Refrigerated Transport, Nov. 1978, pp. 93-95.
Tesco Turns Inventory From Vendors to Store Shelves on a 30-Hour Cycle, Refrigerated Transport Jan. 1997 p. 12-13.
Advertisement for "Insulated Products" by Donovan, Refrigerated Transport, Apr. 1997, p. 27.
FG Products, "Insulated Bulkheads," (2001) 7 pages.
FG Products, "Floater II Insulated Bulkhead," (2005), 1 page.
FG Products, "Re-Flex Insulated Bulkhead," (2005), 1 page.
FG Products, "Center Partition Systems—Designed for positive temperature control," (1997), 3 pages.

* cited by examiner

SYSTEMS AND METHODS FOR SEPARATING CARGO SPACES

TECHNICAL FIELD

This disclosure relates to partitioning cargo spaces, such as adjustable panels that can partition spaces in a temperature-controlled cargo container so as to provide different temperature zones during transport.

BACKGROUND

Temperature-controlled cargo containers, such as refrigerated trailers, are commonly used to transport food products and other temperature-sensitive products. A refrigerated trailer generally includes a refrigeration unit mounted to the front wall of the trailer with inlet and outlet portions protruding into the interior of the trailer. The outlet of the refrigeration unit forces cooled air into the trailer near the ceiling of the trailer, thus causing the cooled air to cycle through the trailer. The inlet of the refrigeration unit is positioned to receive air that has cycled into the trailer. Refrigerated trailers are typically configured so as to define a single enclosed space. When the temperature-sensitive cargo does not fill the entire trailer space, cooling the entire space can be inefficient.

In some circumstances, movable bulkheads panels can be employed to divide the trailer space into zones of selected sizes. The bulkhead panels can be stowed near the ceiling of the cargo space when they are not in use. Due to the size and construction of the bulkhead panels, the panels can sag or otherwise deform when in the stowed position.

SUMMARY

Some embodiments of a system for separating cargo spaces in a temperature-controlled cargo container (such as a refrigerated trailer) can include first and second panels that are mountable in an interior space of the cargo container by a track-mounting system to movably support the first and second half-width bulkhead panels in the trailer. The first and second panels may have a generally flexible construction to absorb impacts from cargo, forklifts, or the like, but may also include stiffening members that are coupled to the first and second panels to provide added rigidity in particular orientations. Each stiffening member can be vertically oriented to extend generally parallel to the height of the corresponding first or second panel so that, when the corresponding panel is secured in a stowed position adjacent to the ceiling, the rigid stiffening member can reduce the likelihood of bowing, sagging, bending, or other deformation that may otherwise occur in the generally flexible panel body. In some circumstances, the stiffening members may be removably coupled to exterior faces of the first and second panels so that a stiffening member can be readily replaced while the panels remain mounting in the trailer space.

In particular embodiments, a system for separating cargo spaces in a refrigerated trailer may include first and second half-width bulkhead panels that are mountable in an interior space of a trailer. When the panels are mounted in the trailer, the first and second half-width bulkhead panels may be releasably securable together in a side-by-side configuration to form a full-width bulkhead that extends between opposing sidewalls of the trailer. The system may also include a track-mounting system to movably support the first and second half-width bulkhead panels in the trailer. The mounting system may be attachable to at least one of a wall or a ceiling of the trailer. When the panels are mounted in the trailer, the mounting system may provide each of the first and second half-width bulkhead panels with a first degree of freedom to convey the panels in a longitudinal direction independently of one another and may also provide each of the first and second panels with a second degree of freedom to raise the panels independently to a stowed position. The system may further include elongate rigid members removably coupled to exterior faces of the first and second half-width bulkhead panels. Each elongate rigid member may extend generally parallel to the height of its corresponding half-width bulkhead panel. The elongate rigid members may be substantially more rigid than the first and second half-width bulkhead panels so as to hinder deformation of the first and second half-width bulkhead panels when raised to the stowed position.

In some embodiments, a system for separating cargo spaces in a refrigerated trailer can include first and second half-width bulkhead panels that are mountable in an interior space of a trailer. When the panels are mounted in the trailer, the first and second half-width bulkhead panels can be releasably secured together in a side-by-side configuration to form a full-width bulkhead that extends between opposing sidewalls of the trailer. The system may also include a track-mounting system to movably support the first and second half-width bulkhead panels in the trailer. The track-mounting system may include a plurality of longitudinal rails attachable to at least one of a wall or a ceiling of the trailer. When the panels are mounted in the trailer, the track-mounting system may provide each of the first and second half-width bulkhead panels with a first degree of freedom to convey the panels in a longitudinal direction independently of one another and may provide each of the first and second panels with a second degree of freedom to raise the panels independently from an operative position to a stowed position proximate the ceiling of the trailer. The system may further include elongate rigid members removably coupled to exterior faces of the first and second half-width bulkhead panels so that each elongate rigid member extends in a generally vertical direction when its corresponding half-width bulkhead panel is in the operative position. The elongate rigid members may be substantially more rigid than the first and second half-width bulkhead panels so as to hinder deformation of the first and second half-width bulkhead panels when raised to the stowed position.

In particular embodiments, a method for using panels in a cargo space of a trailer can include the operation of releasably securing first and second half-width bulkhead panels in a side-by-side configuration using fastening straps. The first and second panels may form a full-width bulkhead panel in a cargo space of a trailer. Also, the first and second panels may be coupled with elongate rigid members that extend in a generally vertical direction between the trailer floor and ceiling when the first and second panels are arranged in operative positions. The first and second panels may be coupled to a track-mounting system that is attached to at least one of a side wall or a ceiling of the trailer. The method may also include independently moving the first half-width bulkhead panel in a longitudinal direction relative to the second half-width bulkhead panel in the cargo space. The method may further include independently raising a lower portion of the first half-width bulkhead panel relative to the second half-width bulkhead panel in the cargo space so that the first half-width bulkhead panel is secured in a stowed position proximate to the ceiling of the trailer, the elongate rigid member coupled to the first half-width bulkhead panel being substantially more rigid than the first half-width bulkhead panel so as to hinder deformation of the first half-width bulkhead panel when raised to the stowed position.

These and other embodiments described herein may provide one or more of the following benefits. First, some embodiments of a system separating cargo spaces in a trailer can be configured with two half-width bulkhead panels suitable to divide the trailer into at least a front and a rear zone. As such, the trailer can provide a number of different climate-controlled zones, for example, during the transport of perishable items. Second, the panels can be mounted to a track-mounting system that permits an individual user to readily move the panels between an operative position and a stowed position proximate to a ceiling of the trailer. As such, the panels can be stored during periods of non-use without disassembling or removing the panels from the trailer. Third, each of the half-width bulkhead panels can be configured to reduce the likelihood of sagging (or other deformation) and thereby substantially retain their original shape during their operational life. For example, the panels can be exposed to extremely high temperatures during periods of non-use (e.g., when in the stowed position inside a trailer that is exposed to intense sun and heat during a period of non-use). Such conditions might ordinarily cause the stowed panel to sag under the intense heat in the trailer, but the panel can be equipped with a stiffening assembly that provide rigidity in selected locations along the stowed panel so as to hinder such sagging or other deformation. As such, the panels can be configured to substantially maintain their non-bowed (or non-deformed) shape even though the panel bodies are sufficiently flexible to absorb impacts (e.g., from forklifts or cargo). Fourth, in some embodiments, the stiffening members may be removably coupled to exterior faces of the first and second panels. Accordingly, a stiffening member that becomes broken or deformed in the trailer can be readily replaced while the panels remain mounting in the trailer space.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
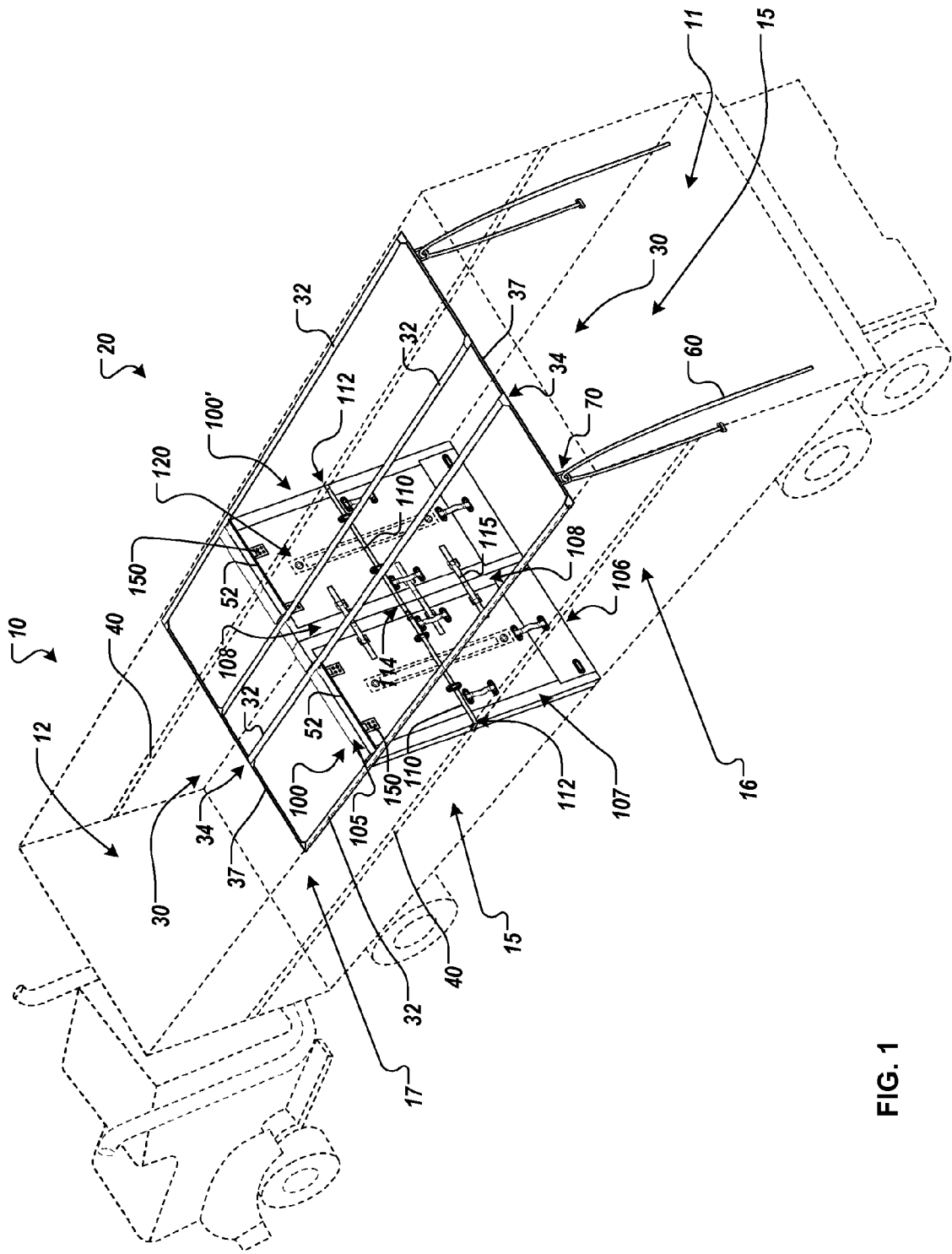
FIG. 1 is a perspective view of a trailer containing a system for separating cargo spaces, including two half-width bulkhead panels, in accordance with some embodiments.

Referring to FIG. 1, a trailer 10 can enclose a cargo space 15 used for the transport of perishable and/or non-perishable items. In some embodiments, one or more of the items transported within the cargo space 15 may be physically separated from other items within the cargo space 15 for storing in different zones within the trailer 10 (e.g., different temperature zones). For example, some items may be required to be stored at temperatures, all of which are at or below the freezing point of water (e.g., a "frozen" zone), while other items may be required to be stored at ambient temperatures (e.g., a non-climate controlled zone). Still other items may be required to be stored at temperatures that are above freezing, but are below ambient temperatures (e.g., a "refrigerated" zone). In other embodiments, separation into zones may not be done to provide for different temperature zones. For example, zones may be separated based on the delivery point of the items within each zone. In this example, items for a particular delivery stop can be organized into a single zone. When the trailer arrives at a delivery stop, the entire contents of one zone, corresponding to the delivery stop, can be off-loaded to that stop.

In some embodiments, a system 20 for separating cargo spaces in a trailer can include two half-width bulkhead panels 100 and 100', where the panels can divide the trailer into a front and a rear zone when the panels 100 and 100' are mounted in a side-by-side configuration and releasably secured to each other and the trailer 10. In this configuration, the two panels 100 and 100' form a full-width bulkhead that extends between the sidewalls of the trailer 10. The panels can be mounted to a track-mounting system 30 that is attached to at least a wall or ceiling of the trailer 10. The track-mounting system 30 can provide the panels with the freedom to be moved back and forth along the length of the trailer 10 (e.g., in a longitudinal direction), thus adjusting the size of the front and rear zones. The track-mounting system 30 can also provide each of the panels 100 and 100' with the freedom to hingedly raise toward the ceiling (e.g., where the panels are generally horizontal and adjacent the ceiling) of the trailer 10 into a stowed position where the panels 100 and 100' are no longer dividing the trailer into a front and a rear zone. The panels can include rigid elongate members (e.g., stiffening rods 121 as shown in FIGS. 3-6) coupled to the panels 100 and 100' that can hinder deformation of the panels (e.g., when raised to the stowed position). In some embodiments, additional pairs of half-width bulkhead panels 100 and 100' can be mounted to the track-mounting system 30, where each pair can form an additional full-width bulkhead, to further divide the trailer into additional zones. For example, three pairs of half-width bulkhead panels can be mounted to the track-mounting system to divide the cargo space into four distinct zones.

Figure 2:
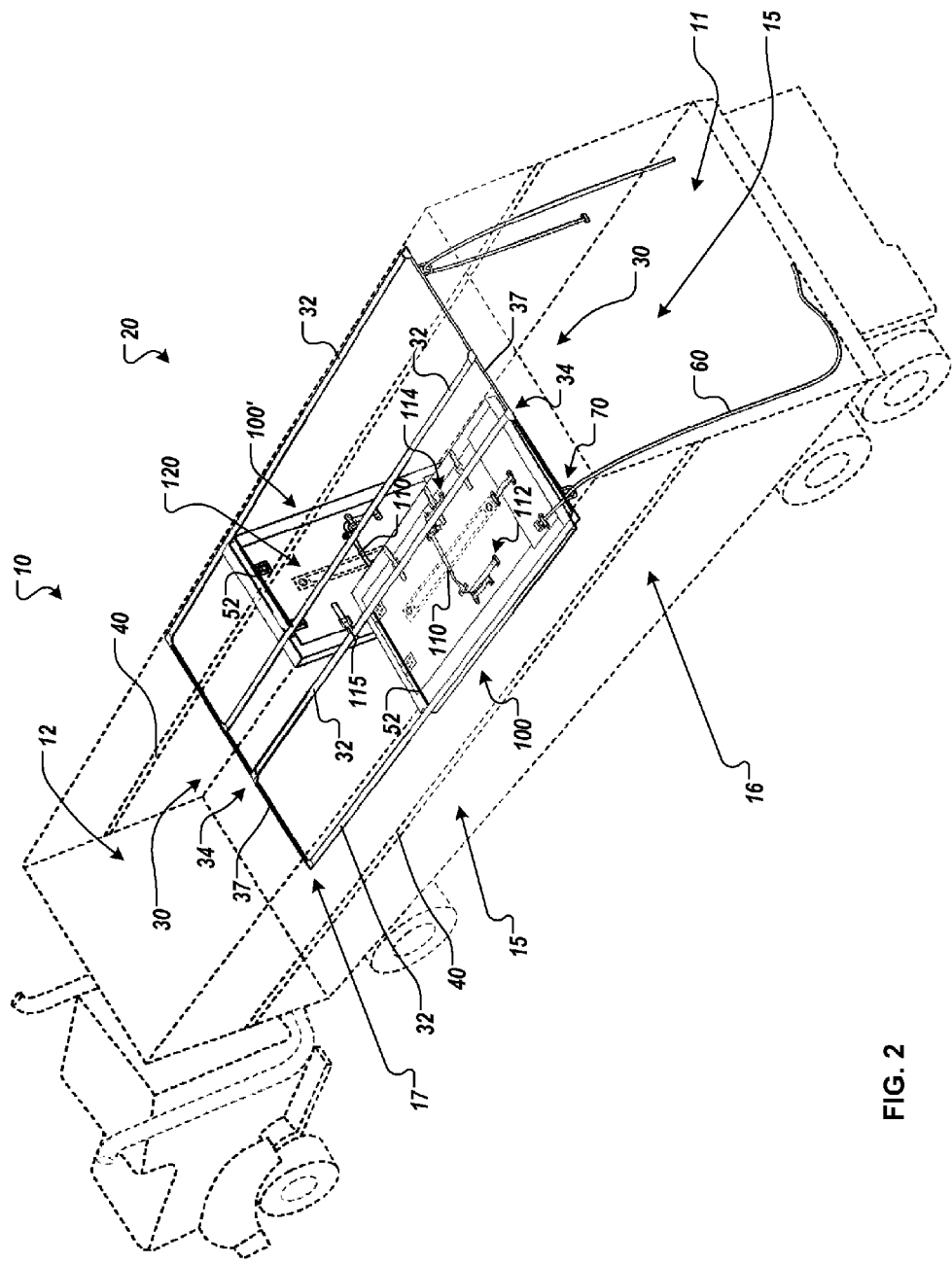
FIG. 2 is a perspective view of the trailer and system for separating cargo spaces of FIG. 1, with one of the half-width bulkhead panels in the stowed orientation.

Referring to FIGS. 1-2, in some embodiments of a system for separating cargo spaces, the cargo space 15 is separated into a plurality of areas (e.g., zones 16 and 17) that can optionally be maintained at different temperatures. Partition panels, such as the partition panels 100 and 100' (e.g., where the panel 100' can be generally a "mirror" configuration of the panel 100), can each be about half the width of the interior of the trailer and extend substantially perpendicular to the long axis of the trailer 10. When secured in a side-by-side configuration to each other and the trailer 10, as depicted in FIG. 1, the panels 100 and 100' can separate the trailer into the front zone 16 and the back zone 17. The partition panels 100 and 100' can include various interfitting modular constructions. In some embodiments, the panels 100 and 100' can mounted within the trailer 10 in such a way that the panels 100 and 100' can be moved within the trailer 10 to alter the size of the zones 16 and 17. The panels 100 and 100' can also be mounted in such a way that the panels 100 and 100' can be individually or collectively transitioned to a stowed position, where they do not divide the cargo space 15 into separate zones. For example, as shown in FIG. 2, the first panel 100 can be adjusted to the stowed position proximate the trailer ceiling while the second panel 100' remains in an operative position in a substantially vertical orientation.

In some embodiments, the panels 100 and 100' can be attached to longitudinal rails 32 (e.g., mounted to the ceiling of the trailer 10, in this embodiment) via trolley assemblies (described in more detail in connection with FIGS. 5 and 6). The rails 32 and trolley assemblies can be components of the track-mounting system 30 that serves to movably mount the panels 100 and 100' in the trailer 10. In some embodiments, the track-mounting system 30 may include end rails 37 positioned near the longitudinal ends 34 of the rails 30 (e.g., across the ceiling of the trailer). The panels 100 and 100' can be hingedly attached to the trolley assemblies, via brackets 150 and hinge rods 52, such that the panels 100 and 100' can pivot from an operative position depicted for panel 100 in FIG. 1 (e.g., in a generally vertical orientation to at least partially divide the cargo space 15 two zones) to the stowed position depicted for panel 100 in FIG. 2 (e.g., in a generally horizontal position adjacent the ceiling, in this embodiment). Furthermore, the trolley assemblies can be movably coupled to the rails 32 such that the trolley assemblies permit the panels 100 and 100' to be longitudinally moved in the rearward direction (e.g., toward the aft portion 11 of the trailer 10) and the forward direction (e.g., toward the fore portion 12 of the trailer 10). Additional pairs of panels, similar to the panels 100 and 100', can be mounted to the track-mounting system and stowed and/or used divide the cargo space 15 into more that two zones.

It should be understood from the description herein that the system 20 for separating cargo spaces can be implemented in a number of different configurations. For example, at least some of the rails 32 may be advantageously installed on the side walls of the trailer (e.g., each panel 100 and 100' being mounted to a rail 32 along the sidewall of the trailer 10 and to another rail 32 along the ceiling of the trailer 10). In some circumstances in which all the rails 32 are mounted to the side walls, the panels 100 and 100' can be configured to open like a standard household door. The assembly for attaching the panels 100 and 100' to the rails 32 was described above as a trolley assembly, but may optionally be replaced with another mechanism that permits rotational, slidable, or hinged movement between the rails 32 and the panels 100 and 100'. Similarly, the rails 32 may be replaced with other receiving members that cooperate with the panels 100 and 100' to provide independent motion for each of the panels 100 and 100'.

Still referring to FIGS. 1-2, the trailer 10 and panels 100 and 100' can include features that can cooperate to maintain the panels 100 and 100' in substantially fixed positions relative to each other and, optionally, to the sidewalls of the trailer 10. For example, the panels 100 and 100' can be equipped with fastening straps 115 that interconnect the panels 100 and 100' in a side-by-side abutting relationship. In another example, the trailer 10 can include side mounting rails 40 and the panels 100 and 100' can include fixation straps to join with the side mounting rails 40. When the panels 100 and 100' are placed in position to divide the cargo space 15 into separate zones (e.g., zones 16 and 17 as shown in FIG. 1), the panels 100 and 100' can be retained substantially in the side-by-side configuration using the fastening straps 115 and retained in place relative to the trailer 10 by securing the exterior portions 112 of the fixation straps 110 to the rails 40 and the interior portions 114 of the fixation straps 110 to each other. Securing the straps 110 and 115 can be accomplished via connectors (e.g., buckles, ratcheting straps, or the like) on the ends of the straps 110 and 115. In some embodiments, a single strap can be used to secure both panels 100 and 100' to the trailer 10 via the side rails 40, instead of the two fixation straps 110.

Figure 3:
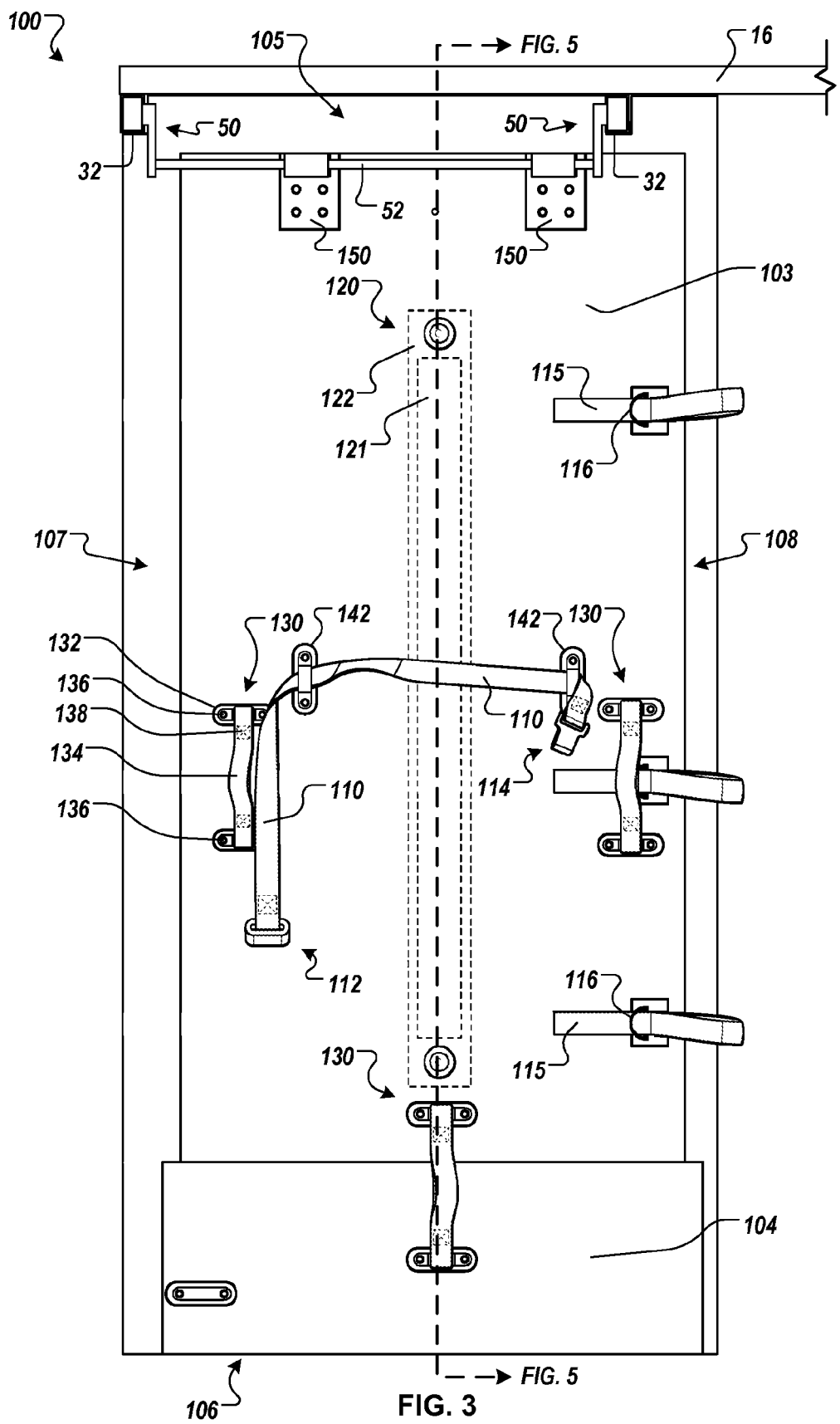
FIG. 3 is a front view of a half-width bulkhead panel with one elongate rigid member, in accordance with some embodiments.
Figure 4:
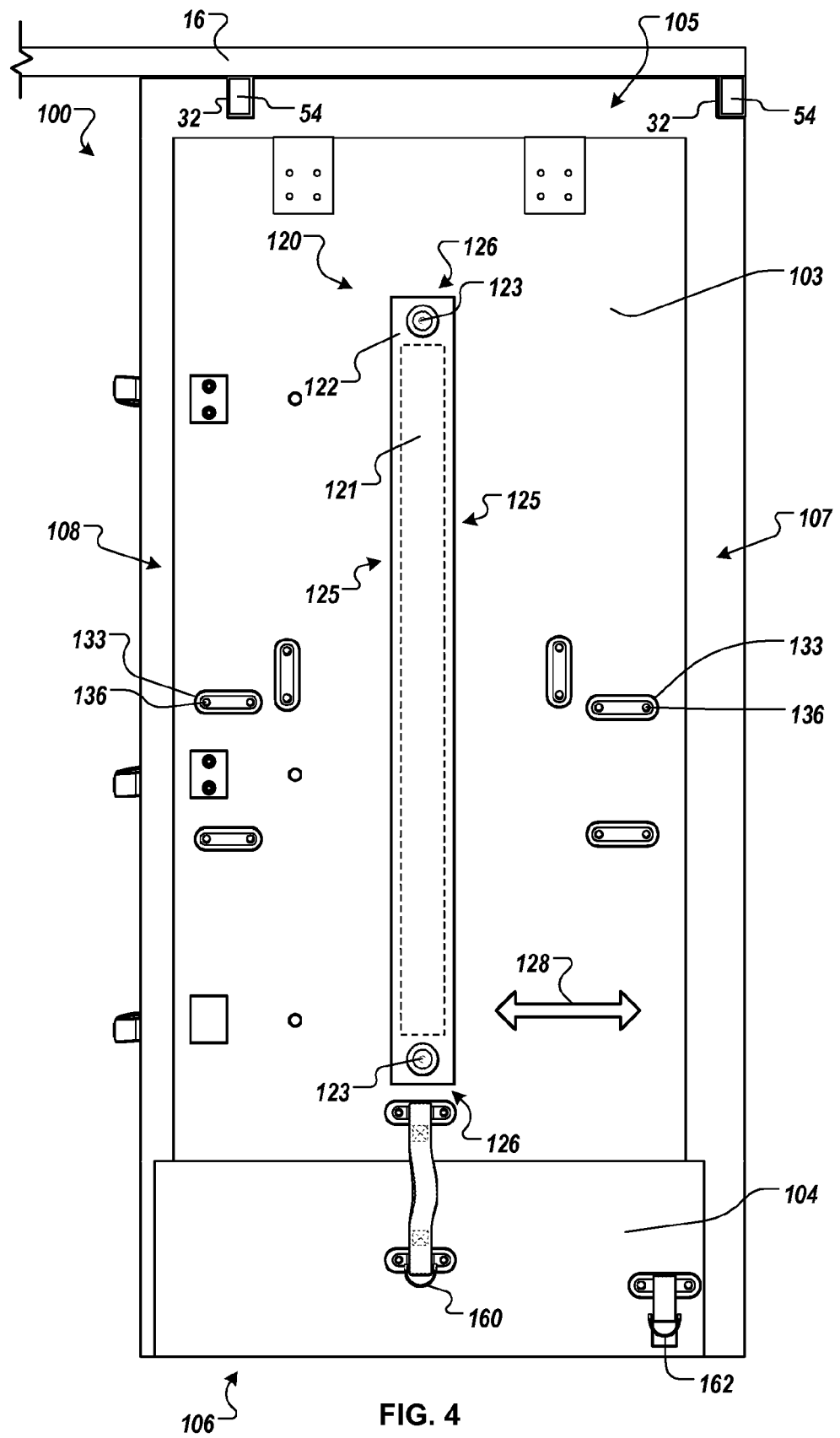
FIG. 4 is a rear view of the half-width bulkhead panel of FIG. 3.

In some embodiments, the panels 100 and 100' can be configured to reduce the likelihood of sagging (or other deformation) and thereby substantially retain their original shape during their operational life. For example, when used to maintain separate temperature zone, the panels 100 and 100' can advantageously retain their substantially rectangular shape (as shown in FIGS. 3 and 4) with their edges against the bulkhead of the trailer 10 to substantially seal air from traveling from one zone 16 or 17, to another. In normal usage, the panels 100 and 100' can be exposed to environmental stresses and impacts that could cause deformation to the panels 100 and 100'. For instance, the panels 100 and 100' can be exposed to extremely high temperatures during periods of non-use (e.g., when in the stowed position inside a trailer that is exposed to intense sun and heat during a period of non-use). Such conditions might ordinarily cause the stowed panel 100 to sag under the intense heat in the trailer 10, but the panel 100 can be configured to hinder such deformation even under these conditions. Moreover, panels 100 and 100' can be configured to substantially maintain their original shape while also being sufficiently flexible to absorb impacts (e.g., from forklifts or cargo) and reduce the likelihood of permanent damage or deformation.

In some embodiments, the panels 100 and 100' can be advantageously constructed from flexible materials that allow the panels 100 and 100' to provide a degree of flexibility (e.g., to absorb impacts and to permit seal compression when forced into the side-by-side configuration). In embodiments where the panels 100 and 100' are constructed from flexible materials, one or both of the panels 100 and 100' may be transiently deformed during an impact but may resiliently return to the original shape without permanent damage or deformation. In addition, each of the panels 100 and 100' can include one or more stiffening assemblies 120, to provide rigidity along selected orientations to thereby hinder sagging or other deformation that can occur due to environmental conditions or other factors. For example, when the panel 100 is in the stowed position depicted in FIG. 2, some factors such as intense heat and gravitation forces might otherwise cause the panel 100 to sag over time without the stiffening assembly 120. When in the stowed position, the panel 100 receives mounting support near the top edge (e.g., via the brackets 150) and near the bottom edge (e.g., via the lifting strap 60). In certain environmental conditions such as high heat, the panel 100 might sag or bow along the longitudinal length of the panel 100, but the stiffening assemblies 120 can impart additional stiffness to the panels 100 and 100', thus helping to reduce the likelihood of such sagging or other deformation.

In some embodiments, one or more sets of straps 60, mechanisms 70, and safety chains (not shown in FIGS. 1-2) can be mounted to the rails 32 or 37 for the purpose of pivoting the panel 100 from an operative position (depicted by panel 100 in FIG. 1) to a stowed position (depicted by panel 100 in FIG. 2) and securing it in the stowed position proximate to the ceiling of the trailer 10. Such features are described in more detail below in connection with FIGS. 6-8.

As described previously, the partition panels 100 and 100', can be used to subdivide the interior space 15 of the trailer 10 into a plurality of individual zones 16 and 17. Optionally, the panels 100 and 100' can also be used to substantially seal airflow around the periphery of the panels 100 and 100', between the two zones 16 and 17, for the purpose of maintaining different temperatures in the zones. For example, in FIG. 1, the panels 100 and 100' can be used to divide the trailer 10 into temperature-controlled zones 16 and 17 where the rear zone 16 can remain at ambient temperature while the zone forward 17 can be maintained at a lower temperature (e.g., between about 10° F. and about 20° F., below 32° F., between about 37° F. and about 41° F., below about 45° F., or the like). In other examples, more than two zones can be defined by additional pairs of half-width panels (e.g., panels similar to the panels 100 and 100'). Two pairs of panels could be used to create three zones within the trailer 10, optionally all being maintained within different temperature ranges.

Referring now to FIG. 3, in some embodiments, the panel 100 can serve as an insulative barrier and may include an inner core material that enhances the insulative effects. For example, the panel 100 can have a multi-layer construction that includes an internal core 102 (FIG. 5) and an external skin 103. As described below in connection with FIG. 5, the internal core 102 can include a flexible foam material, such as an expanded polypropylene, that is bendably resilient and provides suitable thermal insulation properties. The external skin 103 can include nylon reinforced PVC, bonded directly to the internal core 102, that is durable and resistant to tearing so as to protect the internal core 102 from damage. The panel 100 can include an optional kickplate 104 that can provide additional protection to a lower portion of the panel 100. The kickplate 104 can include materials similar to those included in the skin 103. In alternative embodiments, at least a portion of the panel 100 (e.g., the internal core 102, the external skin 103, or the like) can be constructed from one or more materials including vinyl, fiberglass, acrylonitrile butadiene styrene (ABS), polyurethane, and the like.

The panel 100 can include a flexible seal, arranged along the outer periphery, such as a flexible PVC edge seal that can conform to surrounding objects (e.g., walls, ceiling, abutting panel edges, or the like) and resiliently return to its original shape. For example, a top edge seal 105 can abut a roof 16 of the trailer 10 (FIG. 1), thereby reducing or eliminating the flow of air between the roof 16 of the trailer 10 and the panel 100. Similarly, an outside edge seal 107 can abut the sidewall of the trailer 10. Optionally, a bottom edge seal can be included along the bottom edge 106 of the panel 100 so as to seal with the floor of the trailer 10. In some embodiments, such as the one described in connection with FIG. 1, two half-width bulkhead panels 100 and 100' are positionable side-by-side to form a full-width bulkhead that acts as a thermal barrier between the two zones 16 and 17. When the panels are positioned as in FIG. 1, an inside edge seal 108 of panel 100 can abut an adjacent inside edge seal 108 of the neighboring panel (e.g., panel 100'). The seal therebetween can be secured or supplemented by fastening straps 115 that secure the panels 100 and 100' together. The full-width bulkhead formed using panels 100 and 100' can then be secured to the walls of the trailer 10 using the fixation straps 110 that couple with the side rails 40 (FIG. 1). In this way, the trailer 10 can be divided into zones 16 and 17 with different climates, where the flow of air between these two zones 16 and 17, along the periphery of the panels 100 and 100', is generally restricted.

In some embodiments, the panel 100 can include various strap handles 130 that include brackets 132, backing plates 133 (see FIG. 4), straps 134, and fasteners 136. The straps 134 can be looped around the brackets and bonded at points 138 and the brackets 132 can be coupled to the panel 100 using the fasteners 136 for the purpose of securing the straps 134 to the panel 100. This can be done in a way that leaves enough of the straps 134 free such that an individual can grasp the strap handles 130 and use them to maneuver the panel 100 within the trailer 10 (see FIG. 1). For example, when oriented as in FIG. 1, the strap handles 100 can be used, by an individual standing in zone 16, to pull the panel 100 toward the front portion 11 of the trailer 10. The strap handles 130 can also be used to lift the bottom portion of the panel 100 to transition the panel 100 from vertical orientation (e.g., as depicted by panel 100 in FIG. 1) to a horizontal orientation (as depicted by panel 100 in FIG. 2) proximate the roof 16 of the trailer 10. In this orientation, the panel 100 can be stored out of the way, while still advantageously being attached to the trailer 10. The fastening straps 115 on the panel 100 can be used with corresponding features on the other panel (e.g., the panel 100' shown in FIG. 1), such as buckles 116, to secure the panel 100 to the other panel. Brackets 142 can be used to secure the fixation strap 110 to the first panel 100 such that when the exterior portion 112 of the strap 110 is connected to the trailer 10 (e.g., via one of the side rails 40 as shown in FIG. 1) and the interior portion 114 of the strap 110 is connected to the second panel 100' the first panel 100 is held substantially in place relative to the trailer wall.

Still referring to FIG. 3, each of the panels 100 and 100' (panel 100 is depicted in this example) can be hingedly attached to one or more trolley assemblies 50 (described in greater detail below in connection with FIGS. 5 and 6) via the brackets 150 and the hinge rod 52, such that the panel 100 can independently pivot from the operative position depicted for panel 100 in FIG. 1 (e.g., to at least partially divide the cargo space 15 into a plurality of zones) to the stowed position depicted for panel 100 in FIG. 2 (e.g., to store the panels without dividing the cargo space 15). Furthermore, the trolley assemblies 50 can be slidably attached to rails, such that the trolley assemblies 50 permit each of the panels 100 and 100' to be moved independently in the fore direction (e.g., toward the front portion 12 of the trailer 10) and the aft direction (e.g., toward the back portion 11 of the trailer 10). Thus the track-mounting system 30 can provide each of the panels 100 and 100' with two degrees of freedom for movement within the trailer 10.

In this embodiment, each of the panels 100 and 100' can be configured to have a height that is greater than the floor-to-ceiling height of the trailer 10. For example, as shown in FIG. 3, the panel 100 can be about 102" tall (e.g., from the bottom 106 to the top seal 105) which is greater than the floor-to-ceiling height of the trailer 10 in FIG. 1. In other embodiments, the panel 100 can be custom made to any height necessary for use in trailers of differing heights. The panels 100 and 100' can be configured to be slightly taller than the interior height of the trailer it is dividing such that when secured, the top edge seal 105 can compress against the roof 16 while the bottom edge 106 is pressed against the floor of the trailer 10, thus restricting migration of air through the periphery of the panel 100 when in the operative position (FIG. 1).

In some embodiments, each of the panels 100 and 100' can be about 49" wide (see FIG. 3), or slightly larger than about half the width of a 97" wide trailer, such as the trailer 10 in FIG. 1. In other embodiments, the panel 100 can be custom made to any width necessary for use in trailers of differing widths. In some embodiments, like the one described in connection with FIG. 1, two panels 100 and 100' can be secured in a side-by-side configuration to form a full-width bulkhead that extends between the sidewalls of the trailer 10. In other embodiments, more than two panels can be used side-by-side to form a full-width bulkhead that extends between the sidewalls of a trailer 10. The panels 100 and 100', when secured to form a full-width bulkhead, can be configured to be slightly wider than interior width of the trailer 10 they are dividing such that when secured, the outer edge seals 107 of panels 100 and 100' can compress against the sidewalls of the trailer 10 while the inner edge seals 108 of the panels 100 and 100' can compress against one another, thus hindering migration of air through the periphery of panels 100 and 100'.

Referring now to FIG. 4, the stiffening assembly 120 can be arranged on the face of each panel 100 and 100' (panel 100 depicted in FIG. 4) to provide additional rigidity to the panels 100 and 100'. In normal usage, the panels 100 and 100' can be exposed to environmental stresses and/or impacts that that could cause deformation to the panels 100 and 100'. For instance, the panels 100 and 100' can be exposed to extremely high temperatures during periods of non-use (e.g., when in the stowed position inside a trailer that is exposed to intense sun and heat during a period of non-use). Such conditions might ordinarily cause the panel 100 to sag under the intense heat in the trailer 10, but the panel 100 can be configured to hinder such deformation even under these conditions. Moreover, panels 100 and 100' can be configured to substantially maintain their original shape while also being sufficiently flexible to absorb impacts (e.g., from forklifts or cargo) and reduce the likelihood of permanent damage or deformation. In some embodiments, the stiffening assembly 120 is mounted to an outside face of the panel 100 and can include an elongate rigid member 121 such as a stiffening rod, a rod retaining sleeve 122, and securing bolts 123. Mounting the stiffening assembly to the exterior of the panel 100 (as opposed to the interior) can reduce the likelihood of damage to the internal core 102 of the panel 100 (e.g., in the event that the panel 100 is flexed), simplify manufacturing, and/or allow replacement of damaged stiffening rods 121. Moreover, in these embodiments, panels that do not include a stiffening assembly 120 can be readily retrofit with one or more stiffening assemblies 120.

Still referring to FIG. 4, the stiffening assembly 120 can be arranged on an outer face of the panel 100 that is opposite to the straps 110 and 115. For example, in this embodiment, the straps 110 and 115 are mounted on the outer face that faces toward the aft of the trailer 10 while the stiffening assembly 120 is arranged on the opposite face that faces toward the fore of the trailer 10. In some embodiments, the sleeve 122 of the stiffening assembly 120 can be permanently secured to the panel 100 along the long edges 125 in such a way that the rod 121 can be inserted through open short edges 126, into a pocket 127 (see FIG. 6) formed between the sleeve 122 and the outer skin of the panel 110. The pocket 127 formed between the sleeve 122 and the outer skin of the panel 110 can be large enough that the rod can be inserted into the pocket, but small enough that the movement of the rod is generally restricted in the side-to-side direction.

The stiffening assembly 120 can also serve as a spacer to prevent cargo from directly abutting the panel 100 in a manner that prevents air flow between the cargo and the panel 100. When transporting cargo in a climate controlled zone, airflow around the cargo can help to properly maintain the temperature of the cargo. If cargo directly abuts the panel 100, it is more likely that the portion of the cargo that abuts the panel will rise/or fall outside the temperature range desired (depending in part on the temperature of the zone on the other side of the panel 100). By keeping the cargo from directly abutting the surface of the panel 100, the stiffening assembly 120 helps to maintain the flow of air around the portion of the cargo closest to the panel 100.

Figure 5:
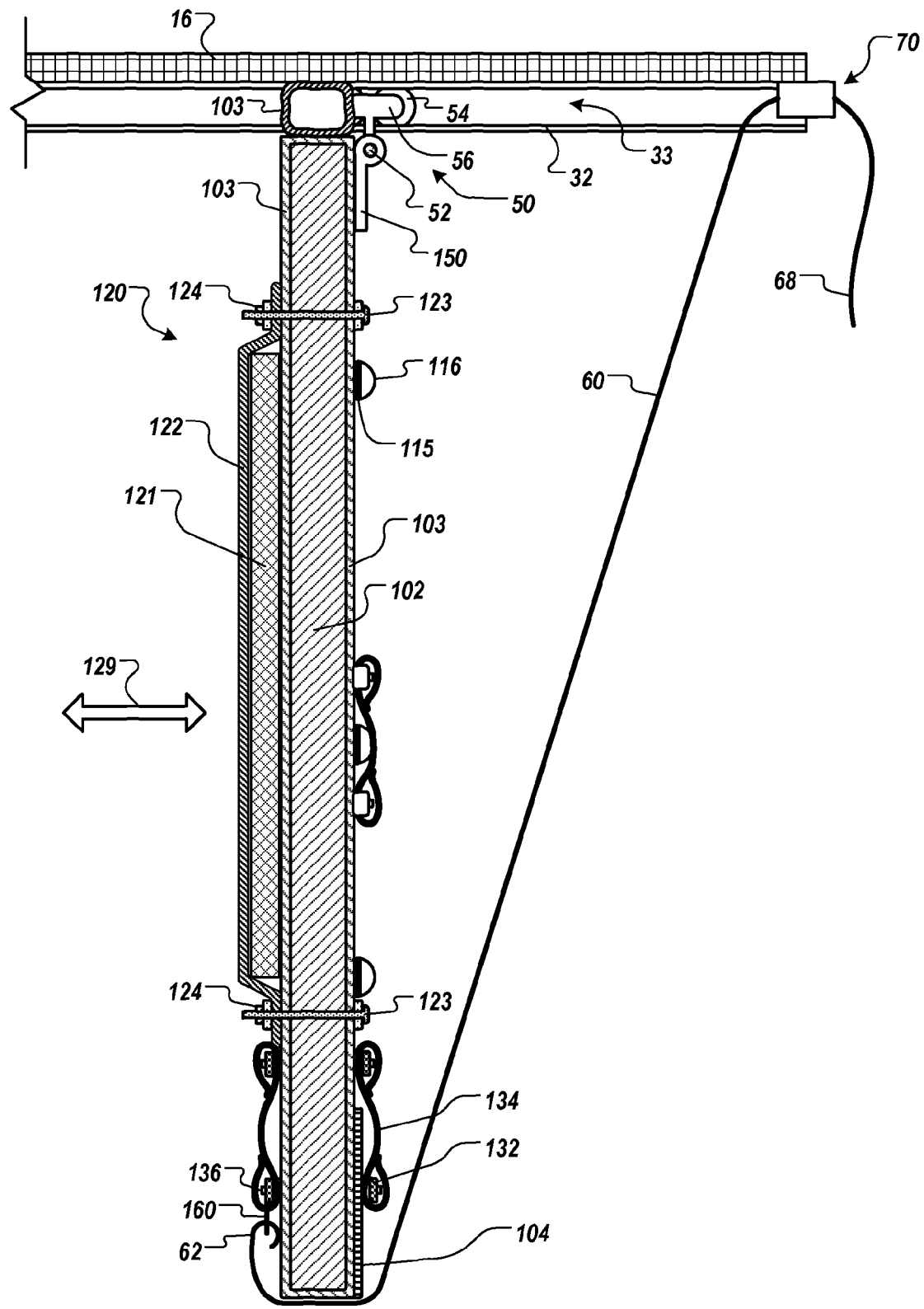
FIG. 5 is a cross-section view of the half-width bulkhead panel of FIG. 3, coupled to a track-mounting system.
Figure 6:
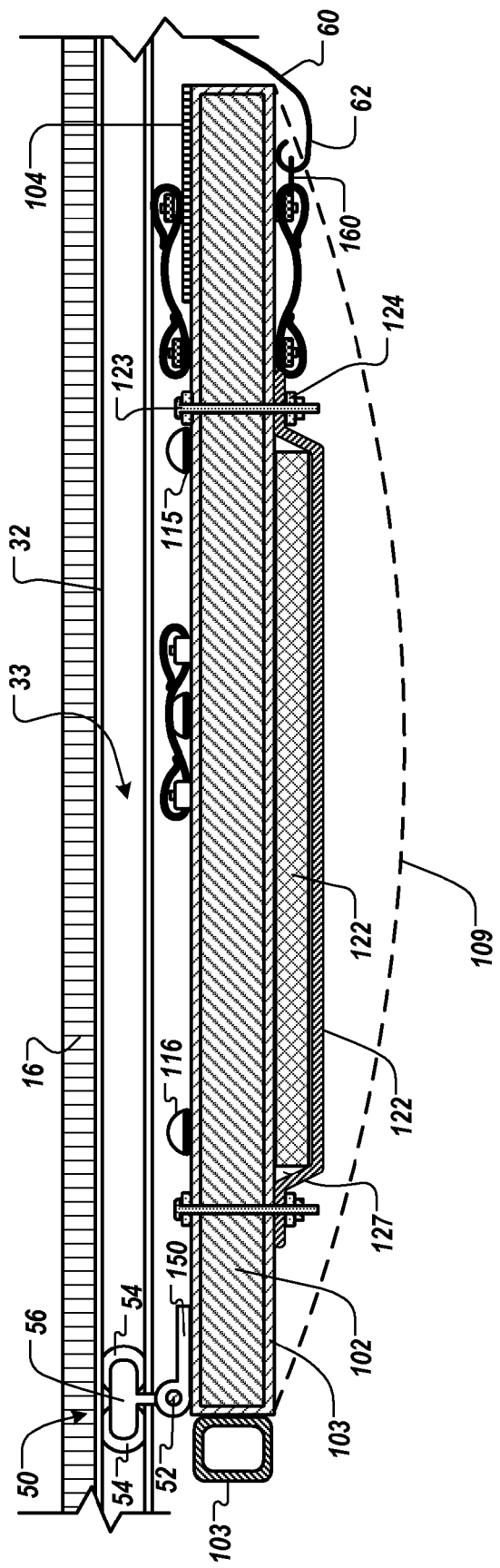
FIG. 6 is a cross-section view of the half-width bulkhead panel of FIG. 3, in a stowed position.

Referring now to FIGS. 5 and 6, in some embodiments, the core 102 of panel 100 is constructed of one or more lightweight, flexible materials, with good thermal insulation properties, such as expanded polypropylene. Materials that can be used in the construction of the core 102 can include Icynene foam, Poly-Urethane foam, disperse PVC foam, soy-based expanding foam, and the like. The core 102 can be configured such that it can resiliently deform and return to its original shape (e.g., in the event of an impact from cargo, a forklift, or the like). The flexible, resilient core 102 can be surrounded by the external skin 103 to protect the core from damage. In some embodiments, while the core 102 can be flexible, resilient, and resistant to damage from stress and blunt impact, the core 102 may be susceptible to damage from sharp objects, or scraping against other objects. The skin 103 can be constructed of one or more materials, such as nylon-reinforced PVC, that can be directly bonded to the core 102. Such a configuration can protect the core 102 from sharp objects and frictional damage caused by, for example, dragging the panel along the floor of a trailer. Additional materials that can be used in the skin 103 can include nylon, PVC, ABS, fiberglass, polyurethane, and any other materials suitable for this purpose.

In some embodiments, the stiffening rod 121 can be a solid 40" long cylindrical shaped rod with a diameter of ⅞" that is constructed of one or more materials such as pultruded fiberglass. The stiffening rod 121, in this embodiment, is located generally in the middle of the panel 100 and oriented vertically (e.g., along the height of the panel). The sleeve 122 can be constructed, at least in part, of nylon reinforced vinyl, similar to, but thicker than, the material used to construct the skin 103, and can be hot welded to the skin 104. In other embodiments, the stiffening rod 121 can be longer or shorter and/or thicker or thinner, depending on the required amount of stiffening desired. The stiffening rod 121 can be solid or hollow and can be made of any material suitable to add rigidity to the panel 100 in selected orientations. Examples of the one or more materials that can be used to construct the stiffening rod 121 include metals, plastics, fiberglass, ABS, and other materials suitable for adding stiffness to the panel 100. In some embodiments, multiple stiffening assemblies 120 can be used to add stiffness to the panel 100.

Still referring to FIGS. 5 and 6, the panel 100 can be hingedly attached to the one or more trolley assemblies 50 via the brackets 150 and the hinge rod 52, where each of the trolley assemblies 50 is slidably attached to one rail 32. In some embodiments, the rail 32 can include an internal channel 33 configured to receive a mating member of the trolley assembly 50, such as one or more rollers 54. The ends 34 of the longitudinal rails 32 (see FIG. 1) can be coupled to the end rails 37 that extend laterally across the trailer ceiling. In such circumstances, the end rails 37 can function as a stop for the trolley assembly 50. In some embodiments, each of two trolley assemblies 50 can include a trolley 56 that can suspend the horizontal hinge rod 52 between the two trolley assemblies 50 (see also FIG. 3) and the panel 100 can hang from the hinge rod 52 (see also FIG. 3) via the brackets 150. The trolley assemblies 50 can include the rollers 54 which permit the panel 100 to be moved into a desired longitudinal position, as described previously in connection with FIGS. 1-2. The combination of the brackets 150 and the hinge rod 52 permits the panel 100 to rotate about the hinge rod 52 and transition between the orientations depicted in FIGS. 5 and 6.

In some embodiments, the panel 100 can be transitioned from the generally vertical position shown in FIG. 5 to the stowed position, proximate the ceiling 16 by lifting the bottom of the panel 100 up and toward the rear of the trailer. In some embodiments, the panel can be lifted manually to the horizontal position showed in FIG. 6. In some embodiments, the panel 100 can be lifted using the strap 60 and lift mechanism 70. In this example, the panel 100 can be moved fore or aft, as needed, to position the base of the panel 100 proximate to the lifting strap 60 having a hook 62. The hook 62 is secured to the base of the panel 100, for example, by attachment to a cooperating receptacle on the panel 100, such as loops 160 and 162. When the hook 62 is engaging one of the loops 160 or 162, the free end of the strap 60 is pulled downward (e.g., refer to strap portion 68) to raise the base of the panel 100 toward the ceiling 16 of the trailer 10. Once the panel 100 is in the position shown in FIG. 6 (e.g., proximate to or abutting the ceiling 16) at least one safety chain can be attached to the panel 100 (e.g., via the loop 160, the loop 162, the straps 115, the handles 130, or the like) to safeguard against unintended release of the panel 100 from the stowed position. As shown in FIG. 1, the two panels 100 and 100' may be placed side by side and secured together to make a full-width horizontal bulkhead. A user can readily separate the panels 100 and 100' from one another prior to raising the panels in the manner described above. Further, because each panel is independently and slideably mounted, the amount of rearward clearance needed to raise the panel is reduced significantly. The top of the panel can be slid forward as the bottom is raised, which permits the panel to be lifted and stowed even when pallets and cargo are stacked close to the panel. In other embodiments, the panels 100 and 100' can remain secured in the side-by-side configuration during the lifting process (e.g., by pulling two lifting straps 60 to lift the two panels 100 and 100').

Referring now to FIG. 6, when the panel 100 is in the stowed position, the stiffening assembly 120 can be employed to offset particular factors (e.g., intense heat and gravitation forces) that might otherwise cause the panel 100 to sag over time. These factors can be exacerbated when the panel 100 is stored in the horizontal orientation in which the panel 100 receives mounting support near the top edge (e.g., from the hinge 52 via the brackets 150) and near the bottom edge (e.g., from the lifting strap 60 via the hook 160). In certain environmental conditions, a panel that does not include the stiffening assemblies 120 might sag or bow along the longitudinal length of the panel, as depicted by dotted curve 109 (the example curve 109 is exaggerated in FIG. 6 for purposes of illustration). However, the stiffening assemblies 120 can impart additional stiffness to the panels 100 and 100', thus helping to reduce sagging and maintain the panels 100 and 100' in substantially their original shape.

Figure 7:
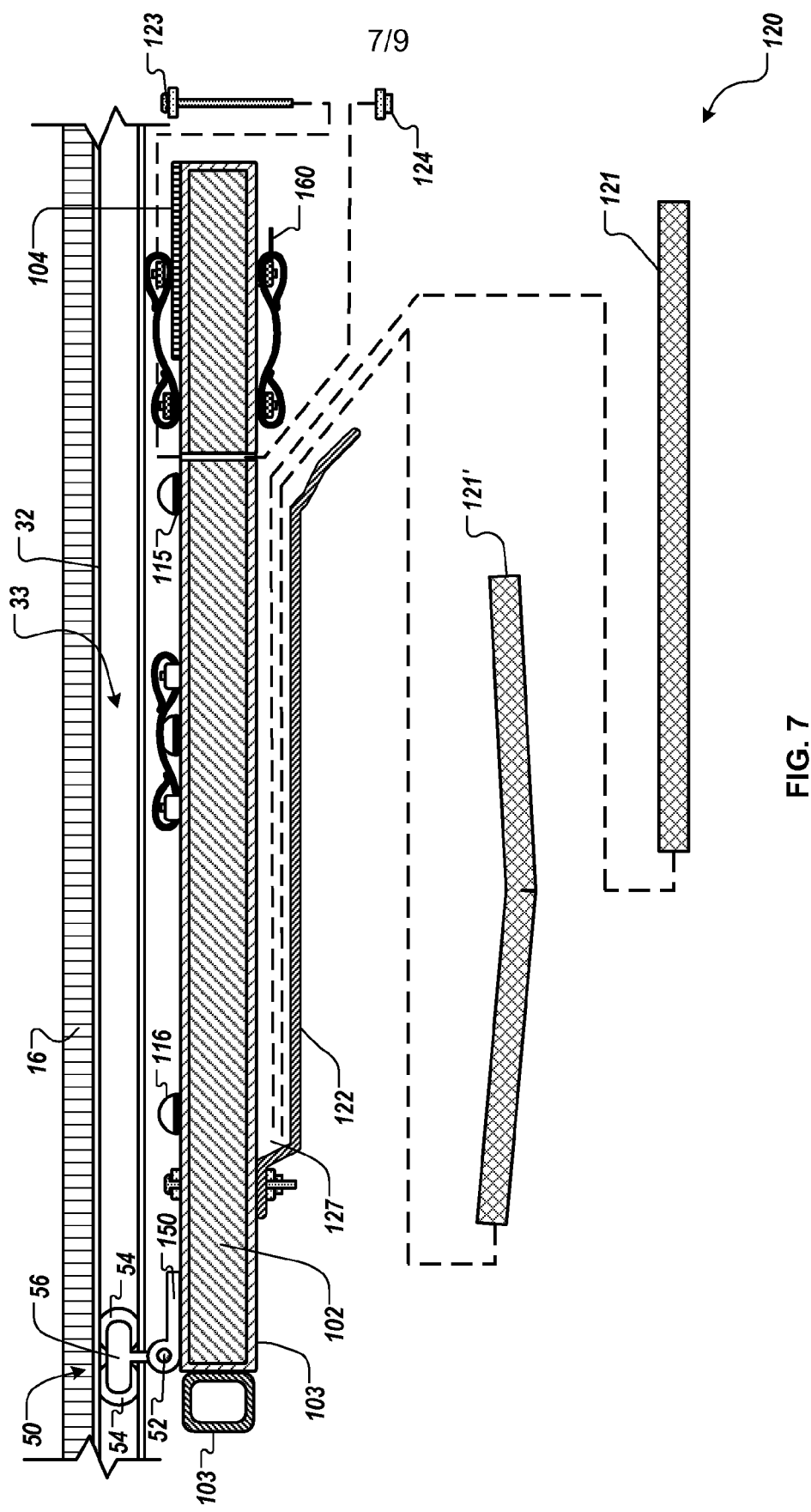
FIG. 7 is a cross-section view of the half-width bulkhead panel of FIG. 3, in a stowed position, with an elongate rigid member removed.

Referring now to FIG. 7, in some embodiments, the stiffening rod 121 can be configured to be replaceable by a user when the panels 100 and 100' are already installed in the trailer 10. The panel 100 (including the internal core 102 and the external skin 103) can be made from flexible materials that allow the panel 100 to resiliently flex under impact. For example, the panels 100 can be configured such that, when they are impacted (e.g., by some of the cargo carried by the trailer 10), the panel 100 can resiliently flex (e.g., elastically deform) to absorb the impact and reduce the likelihood of damage. However, due to factors such as the weight of the panel 100 itself, exposure to high temperatures, and the like, the panel 100 can sag or otherwise deform when retained in the stowed position over an extended period of time. For this reason, the panels 100 and 100' can be equipped with the stiffening assembly 120 to help reduce the likelihood of such deformations and maintain the panels in their original shape. In some embodiments, the stiffening rod 121 can be constructed of a material that is more rigid than the internal core 102 and external skin 103 of the panel 100. In the event that external forces (e.g., a significant impact) cause the panel 100 to severely bend, the stiffening rod 121 might crack, break, or otherwise deform. As such, the stiffening assembly 120 can be configured in such a way as to make the stiffening rod 121 replaceable by a worker even when the panels 100 and 100' are already mounted to the trailer 10.

As shown in FIG. 7, a damaged rod 121' (e.g., a stiffening rod 121 damaged by impact, or the like) can be replaced by removing one or more of the securing bolts 123. Removing fastener 124 (the bolt closest to the bottom of the panel 100), can create an opening 125 in the sleeve 122, large enough that the damaged rod 121' can be removed. Once the rod 121' is removed, a new stiffening rod 121 can be inserted into the sleeve 122 and the fastener 124 can be replaced. The new stiffening rod 121 can thereafter provide rigidity to the panel 100 in a selected orientation, as previously described.

Figure 8:
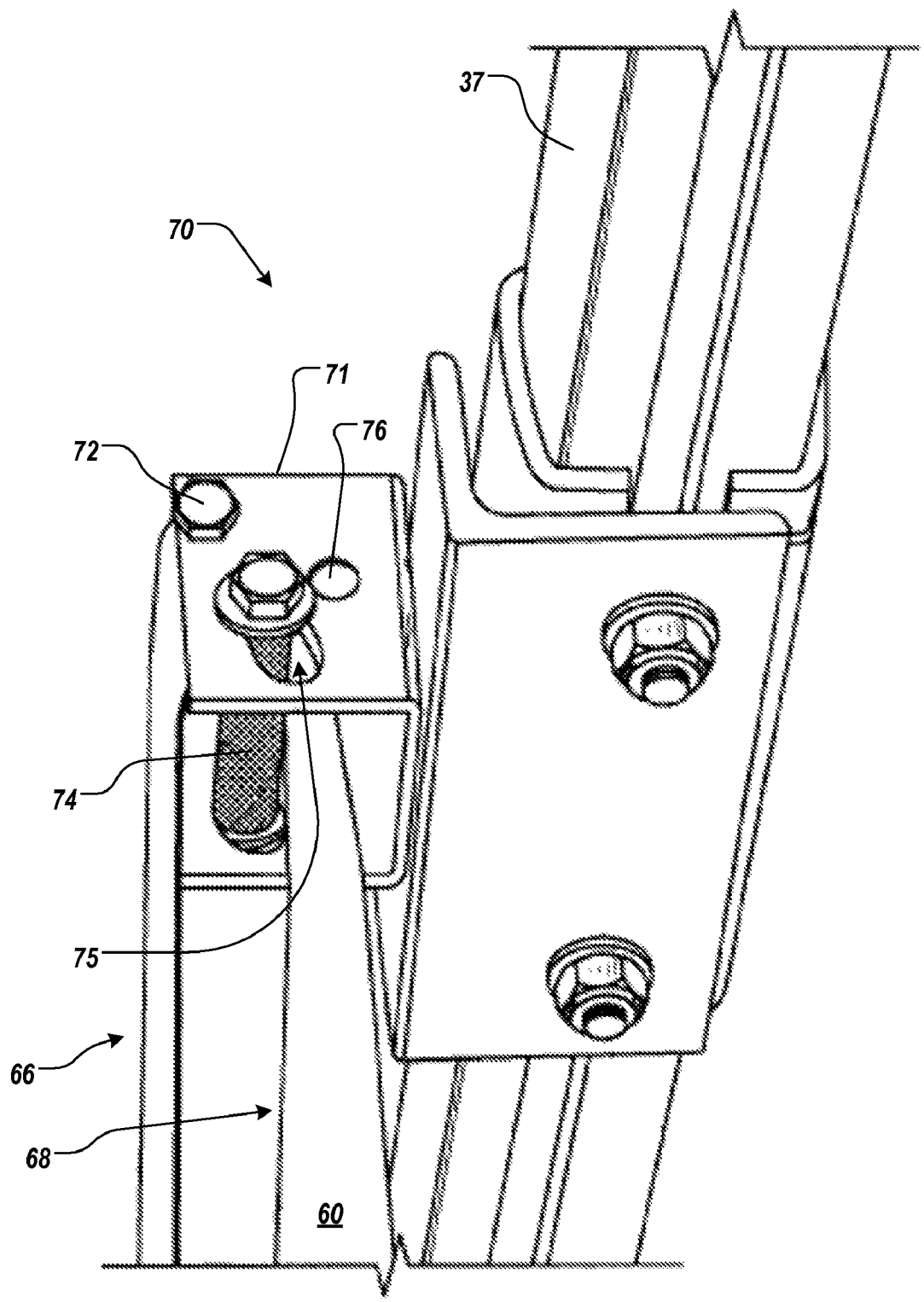
FIG. 8 is a perspective view of an example of a lift mechanism to cooperate with a panel of the system of FIGS. 1-2.

Referring now to FIG. 8, in some embodiments, the strap 60 cooperates with the lift mechanism 70 to help transition the panel 100 from the vertical orientation (shown in FIG. 5), to the stowed position adjacent the ceiling of the trailer 10 (shown in FIG. 6). The lift mechanism 70 can include a frame 71 that is mounted to the end rail 37 (FIGS. 1-2) or to the ceiling. The strap 60 can be positioned over guide pins 72 and 74. The second guide pin 74 can be mountable relative to a fixed pin 76 so as to compress or release the strap 60 therebetween. In use, the left portion 66 of the strap 60 can be attached to the base of a panel 100 and 100' using a suitable attachment mechanism such as a hook and a mateable receptacle. The right portion 68 of the strap 60 is pulled downward until the panel is adjusted to the desired stowed position (see panel 100 in FIG. 2). When the strap portion 68 is released, it can engage the friction surface of the moveable pin 74 so that it transitions in a slot 75 toward the fixed pin 76, thereby compressing the strap 60 and limiting the movement of the panel 100 or 100' connected thereto. To lower the panel, the right portion 68 of the strap 60 is pulled slightly downward and away from the panel 100 and 100' (e.g., away from the first strap portion 66), freeing the moveable pin 74 to slide away from the fixed pin 76. The strap 60 is then free to travel over guide pins 72 and 74 to lower the first strap portion 66 and the panel 100 or 100'. Accordingly, the base of the panels 100 and 100' are lowered toward the floor of the trailer 10 by guiding the strap portion 68 in a manner that allows the moveable pin 74 to shift away from the fixed pin 76 as the strap 60 is pulled over pins 72 and 74 by the weight of the panel.

Figure 9:
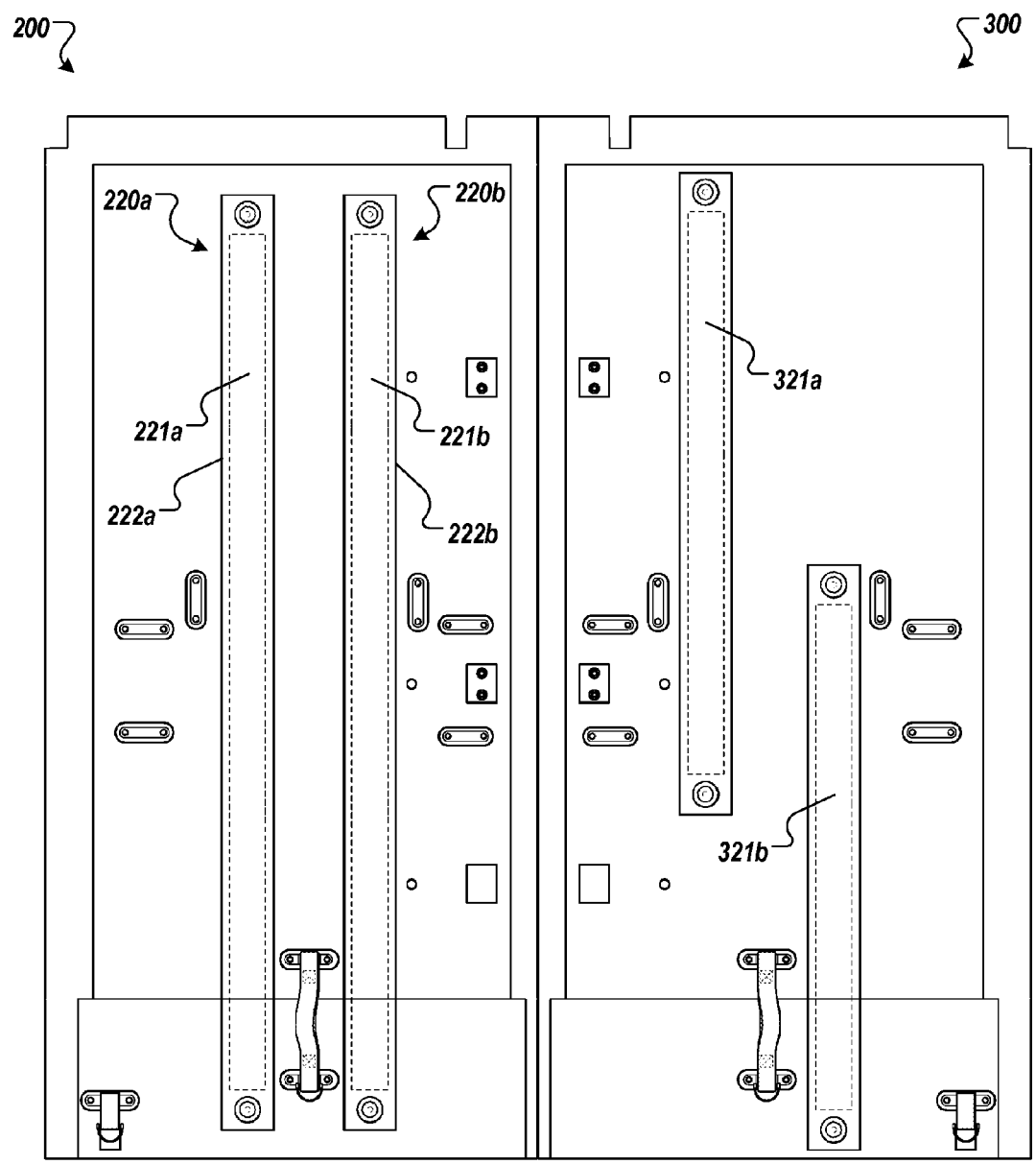
FIG. 9 depicts two half-width bulkhead panels, each with two elongate rigid members, in accordance with alternate embodiments.

Referring now to FIG. 9, alternate embodiments of the panels can be configured to include stiffening assemblies 120 other than that described in FIGS. 5-6. For example, panels 200 and 300 can include more than one stiffening assembly. In the embodiment depicted in FIG. 9, each panel 200 can include two stiffening assemblies 220a and 220b that extend nearly the entire length of the panel 200. For example, the panel 200 can have a height of 102", while stiffening rods 221a and 221b within sleeves 222a and 222b, respectively, can have a length of at least 85", about 90" to about 99", and about 96" in this embodiment. In another example, panel 300 can include stiffening rods 321a and 321b that are different lengths and are located at different heights the panel 300. In this example, rod 321a can be about 70" long, while rod 321b can be about 60" long. As with rods 121, 221*a*, and 221*b*, the length and position of the rods 321*a* and 321*b* can be selected, for example, to avoid interfering with other features (e.g., straps 310, handles 330, or the like) of the panels 100, 100', 200, and 300. In alternate embodiments, other features of the one or more stiffening rods can be selected to provide particular properties (e.g., the degree rigidity, strength, creep resistance, or the like). For example, the stiffening rods can be constructed with a larger or smaller diameter, a solid or hollow center, and/or a longer or shorter length to adjust the properties of the rod 121.

In alternate embodiments, the trolley assemblies 50 can be configured to provide additional or different functionalities. The trolley assembly 50 can optionally be replaced with an alternative mounting mechanism that moveably cooperates with the rails 32. For example, the mounting mechanism can include a post or flange integrally molded into or attached to the panel 100 and adapted to be received into the rails 32. In another example, the mounting mechanism can include a flat slidable member that engages an interior surface of the rail member and is hingedly attached to the panel. Also, in some embodiments, the rails 32 can be replaced with other structures that cooperate with the selected mounting mechanism. For example, the rails 32 may be replaced with longitudinal grooves integrally formed in the walls or ceiling of the trailer 10. As noted above, the rail members can optionally be mounted on the side walls of the trailer 10. Mounting mechanisms can thus be selected to enable the panels 100 and 100' to swing open like a door in addition to moving in the longitudinal direction.

In some alternative embodiments, the stiffening members 121 can be coupled to the panels 100, 100' in configurations other than the stiffening assembly 120 arranged on the exterior face of each panel 100, 100'. For example, each panel 100, 100' may include one or more stiffening members 121 that are embedded in the insulative core 102 and at least partially surrounded by the external skin 103. In such circumstances, the stiffening members may be configured to include smooth surfaces and blunt edges (if any) so as to reduce the likelihood of the stiffening members 121 piercing or otherwise disrupting the surrounding insulative core material when the panel 100,100' deflects during an impact. For example, the embedded stiffening members 121 may comprise a rigid material that is configured to provide an elongated ellipsoid shape to thereby reduce the likelihood of the stiffening members 121 piercing or otherwise disrupting the surrounding insulative core material. In one exemplary embodiment, the embedded stiffening members 121 may be overmolded by the insulative core material, and then the external skin 103 can be applied to the outer surface of the core 102.

In further alternative embodiments, the stiffening members 121 can be coupled to the panels 100, 100' by embedding into the panel surface material. For example, each panel 100, 100' may include one or more stiffening members 121 that are embedded in an interior of the skin 103 so as to define one or more vertically oriented, rigid ribs in each panel 100, 100'. In some embodiments, the stiffening members 121 can be bonded to an internal surface of the skin 103 or integrally molded into the skin structure. After the skin 103 is applied to the inner insulative core 102, the stiffening members 121 can provide the selective stiffening effects to reduce the likelihood of bowing or other deformation (as previously described). Similar to previously described embodiments, the stiffening members 121 may be configured to include smooth surfaces and blunt edges (if any) so as to reduce the likelihood of the stiffening members 121 piercing or otherwise disrupting the neighboring insulative core material when the panel 100,100' deflects during an impact.

In particular alternative embodiments, the stiffening members 121 can be employed during the lifting process. For example, the stiffening member 121 can be coupled to a corresponding panel 100 or 100' so that the hook 62 at the lifting end of the strap 60 is securable to a portion of the stiffening member 121. In some embodiments, the stiffening member 121 be equipped with a cooperating receptacle (e.g., similar to loop 160 in FIG. 5) so as to receive the hook 62. When the hook 62 is engaging one of the cooperating receptacle couple to the stiffening member, the free end of the strap 60 is pulled downward (e.g., refer to strap portion 68 in FIG. 5) to raise the base of the panel 100 or 100' toward the ceiling 16 of the trailer 10. In such circumstances, the lifting force is transferred directly to the stiffening member 121, which may then distribute at least a portion of the pressure along its length to the less rigid panel portions (e.g., inner core 102 and skin 103). In addition or in the alternative, the stiffening member 121 can be coupled to the corresponding panel 100 or 100' so that one or more hinge mounting brackets 150 (FIGS. 3 and 5) are secured to a portion of the stiffening member 121. For example, the securing bolt 123 may be used to attach the mounting bracket 150 to the stiffening member 121. Thus, when the corresponding panel 100 or 100' is suspended from the mounting brackets 150, at least a portion of the support force from the mounting brackets is transferred directly to the stiffening member 121, which may then distribute at least a portion of the pressure along its length to the less rigid panel portions (e.g., inner core 102 and skin 103).

A number of embodiments of the invention have been described. Nevertheless, it will be understood that various modifications may be made without departing from the spirit and scope of the invention. Accordingly, other embodiments are within the scope of the following claims.

What is claimed is:

1. A system for separating cargo spaces in a refrigerated trailer, comprising:
   first and second half-width bulkhead panels that are mountable in an interior space of a trailer, wherein when the panels are mounted in the trailer, the first and second half-width bulkhead panels are releasably securable together in a side-by-side configuration to form a full-width bulkhead that extends between opposing sidewalls of the trailer;
   a track-mounting system to movably support the first and second half-width bulkhead panels in the trailer, the mounting system including a plurality of longitudinal rails attachable to at least one of a wall or a ceiling of the trailer, wherein when the panels are mounted in the trailer, the mounting system provides each of the first and second half-width bulkhead panels with a first degree of freedom to convey the panels in a longitudinal direction independently of one another and provides each of the first and second panels with a second degree of freedom to raise the panels independently from an operative position to a stowed position proximate the ceiling of the trailer; and
   elongate rigid members removably coupled to exterior faces of the first and second half-width bulkhead panels so that each elongate rigid member extends in a generally vertical direction when its corresponding half-width bulkhead panel is in the operative position,
   wherein the elongate rigid members are substantially more rigid than the first and second half-width bulkhead panels so as to hinder deformation of the first and second half-width bulkhead panels when raised to the stowed position.

2. The system of claim 1, wherein each of the elongate rigid members is removably coupled to the exterior faces of the first and second half-width bulkhead panels so that each elongate rigid member is replaceable by a user when the panels are mounted in the trailer.

3. The system of claim 2, further comprising one or more sleeves attached to the exterior faces of the first and second half-width bulkhead panels so as to removably retain each of the elongate rigid members adjacent to the exterior faces of the first and second half-width bulkhead panels.

4. The system of claim 1, wherein each of the elongate rigid members comprises a shaft that extends more than half of the height of the corresponding panel.

5. The system of claim 4, wherein the shaft of each elongate rigid member comprises a rigid pultruded fiberglass material that is substantially more rigid than the corresponding half-width bulkhead panel coupled thereto.

6. The system of claim 5, wherein the first and second half-width bulkhead panels comprises a flexible outer skin coupled to a flexible foam core.

7. The system of claim 1, further comprising fastening straps arranged on exterior faces of the first and second half-width bulkhead panels so as to releasably secure the first and second panels together in the side-by-side configuration when the panels are mounted in the trailer.

8. The system of claim 7, wherein the fastening straps and the elongate rigid members are arranged on opposite exterior faces of the first and second half-width bulkhead panels.

9. The system of claim 7, further comprising fixation straps arranged on exterior faces of the first and second half-width bulkhead panels so as to releasably couple the first and second panels to sidewalls of the trailer when the panels are mounted in the trailer.

10. The system of claim 1, wherein the first and second half-width bulkhead panels abut one another along adjacent peripheral edges of the panels when arranged in the side-by-side configuration.

11. The system of claim 10, wherein the first and second half-width bulkhead panels comprise seal members arranged along the adjacent peripheral edges so that the first and second panels seal together along the adjacent peripheral edges when the first and second panels are releasably secured together in the side-by-side configuration.

12. The system of claim 1, wherein the track-mounting system comprises:
a first set of longitudinal rails to guide movement of the first panel,
a second set of longitudinal rails to guide movement of the second panel, and
at least one end rail extending along the ceiling and generally perpendicular to the first and second sets of longitudinal rails;
wherein when the first or second panel is in a stowed position, a lower edge of the stowed panel is arranged at a rear of the trailer and elevated toward the ceiling so that the lower edge of the stowed panel is positioned proximate to the end rail.

13. The system of claim 12, wherein the mounting system further comprises:
a first trolley assembly engaged with the first set of longitudinal rails, wherein the first panel is coupled to the first set of longitudinal rails by the first trolley assembly,
a second trolley assembly engaged with the second set of longitudinal rails, wherein the second panel is coupled to the second set of longitudinal rails by the second trolley assembly, and
the end rail which is mounted proximate to a longitudinal end of at least one of the longitudinal rails.

14. The system of claim 12, wherein:
at least a portion of a first lift mechanism is mounted to the end rail that extends generally perpendicular to the first and second sets of longitudinal rails, the first lift mechanism engaging a first strap that is coupled proximate to a lower edge of the first panel so as to raise the lower edge of the first panel toward the ceiling when the first strap or rope is manually pulled, and
at least a portion of a second lift mechanism is mounted to the end rail that extends generally perpendicular to the longitudinal rails, the second lift mechanism engaging a second strap or rope that is coupled proximate to a lower edge of the second panel so as to raise the lower edge of the second panel toward the ceiling when the second strap or rope is manually pulled.

15. The system of claim 1, wherein when the first and second half-width bulkhead panels are in the operative position and releasably secured together in the side-by-side configuration in the trailer, the first and second half-width bulkhead panels extend in a substantially vertical direction between the floor and ceiling of the trailer.

16. The system of claim 15, wherein when one of the first and second half-width bulkhead panels is in the stowed position, the stowed panel is hingedly raised to extend in a substantially non-vertical direction in the trailer.

17. A method for using panels in a cargo space of a trailer, comprising:
releasably securing first and second half-width bulkhead panels in a side-by-side configuration using fastening straps so that the first and second panels form a full-width bulkhead panel in a cargo space of a trailer, the first and second panels being removeably coupled with elongate rigid members that extend in a generally vertical direction between the trailer floor and ceiling when the first and second panels are arranged in operative positions, and the first and second panels being coupled to a track-mounting system that is attached to at least one of a side wall or a ceiling of the trailer;
independently moving the first half-width bulkhead panel in a longitudinal direction relative to the second half-width bulkhead panel in the cargo space; and
independently raising a lower portion of the first half-width bulkhead panel relative to the second half-width bulkhead panel in the cargo space so that the first half-width bulkhead panel is secured in a stowed position proximate to the ceiling of the trailer, the elongate rigid member coupled to the first half-width bulkhead panel being substantially more rigid than the first half-width bulkhead panel so as to hinder deformation of the first half-width bulkhead panel when raised to the stowed position.

18. The method of claim 17, further comprising removing the elongate rigid members from the first half-width bulkhead panel while the first half-width bulkhead panel is positioned in the trailer.

19. The method of claim 18, further comprising removably coupling a different elongate rigid member to the exterior face of the first half-width bulkhead panel while the first half-width bulkhead panel is positioned in the trailer.

20. The method of claim 17, wherein each of the elongate rigid members comprises a shaft that extends more than half of the height of the first or second half-width bulkhead panel coupled thereto.

* * * * *